March 26, 1946.  F. W. SCHWINN  2,397,441
TANDEM BICYCLE FRAME
Filed July 26, 1944
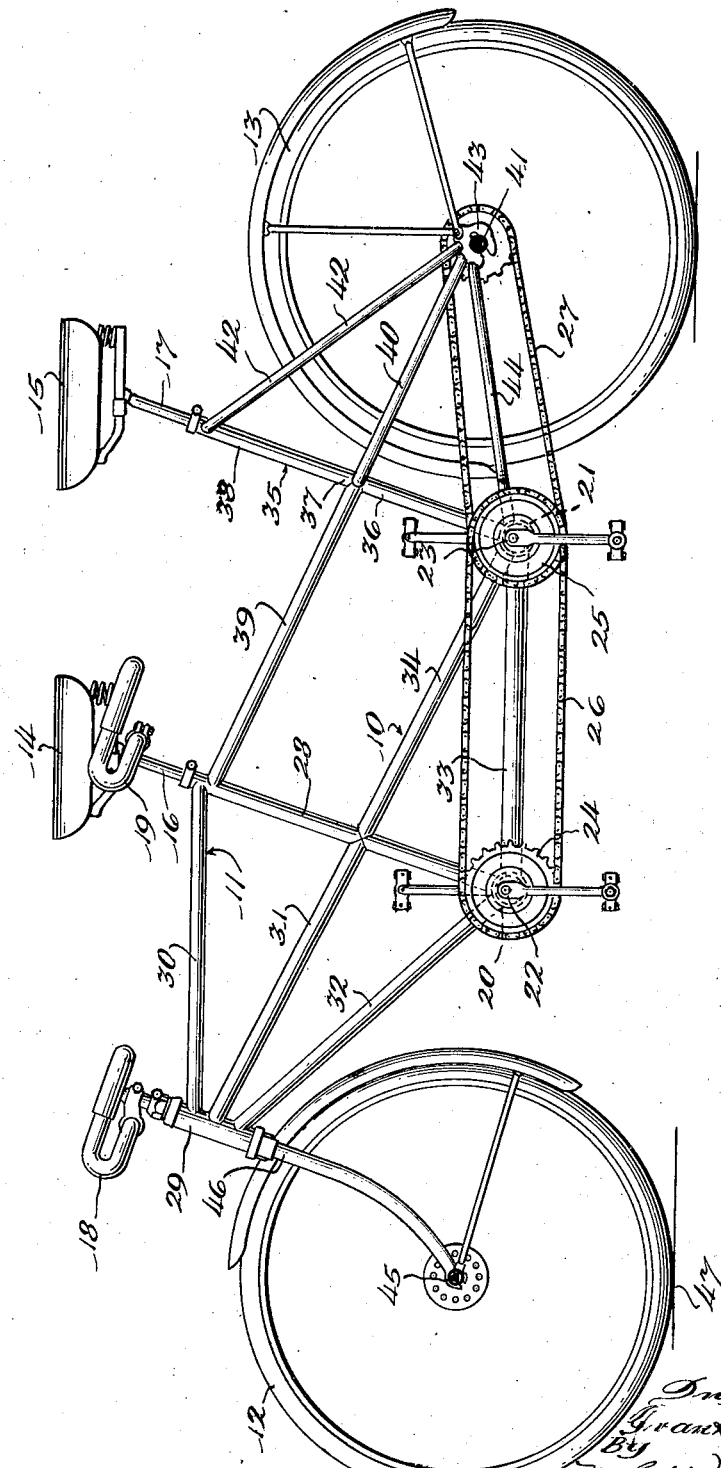
Inventor
Frank W. Schwinn
By
McCabe, Wenth & Dickinson
Attorneys Patented Mar. 26, 1946

2,397,441

UNITED STATES PATENT OFFICE 2,397,441

TANDEM BICYCLE FRAME

Frank W. Schwinn, Chicago, Ill.

Application July 26, 1944, Serial No. 546,655

1 Claim. (Cl. 280—281)

The present invention relates to tandem bicycle frames, and is particularly concerned with a tandem bicycle frame of the type in which provision is made for a female rider in back of the male rider.

In the tandem bicycle frames of the prior art having provision for the female rider in front of the male rider, the low bent tubes at the front, which were used to form the low section of that part of the frame were very weak, with the result that the frame was twisted out of shape easily.

In the devices of the prior art, in order to overcome this weakness, the tandems were provided with heavy cumbersome frames, which were also unsatisfactory on account of their weight.

One of the objects of the present invention is the provision of an improved tandem bicycle frame which is light, yet strong and rigid, and which is peculiarly adapted to resist the forces which are applied to a bicycle frame of this character with a minimum amount of twisting and bending.

Another object of the invention is the provision of an improved tandem bicycle frame embodying a plurality of truss constructions, one within the other, which strengthen greatly the resistance of the frame to twisting and bending, and permit the frame to be made of relatively lighter tubes than the devices of the prior art.

Another object of the invention is the provision of an improved bicycle frame of the tandem type, which is particularly adapted to resist, by torsion of a centrally located frame member, the tendency of the rear crank hanger to twist out of alignment with the front crank hanger when the bicycle is subjected to a turning movement under load.

Another object of the invention is the provision of an improved tandem bicycle frame which may be constructed more economically, yet which is stronger for equivalent weight, than the devices of the prior art, and also which can be used for a long period of time without any possibility of the frame being twisted or bent out of shape when subjected to loads for which it has been designed.

Other objects and advantages of the invention will be apparent from the following description and the accompanying drawing, in which similar characters of reference indicate similar parts throughout the several views.

Referring to the single sheet of drawings, the figure illustrated is a side elevational view of a tandem bicycle frame embodying my invention, the frame being equipped with the usual wheels, handle bar, seats, etc.

Referring to the drawing, 10 indicates in its entirety the tandem bicycle, which is provided with an improved frame 11 constructed according to the invention. The bicycle is provided with the usual front and rear wheels 12, 13, the front and rear seats 14, 15 mounted upon the saddle posts 16, 17. The bicycle also includes the usual front handle bars 18 used for steering the steering wheel 12, but the rear handle bars 19 may be mounted upon the special saddle post 16 so that steering is done only from the front handle bars.

The frame 11 includes the transverse tubular members 20, 21 serving as the front and rear crank hanger members and provided with the crank shafts 22, 23, the cranks and pedals, sprockets 24, 25, and chains 26, 27 for driving the rear wheel 13.

The front portion of the frame 11 is preferably provided with a straight tubular member 28 serving as the saddle post tube and extending from the saddle post socket at its upper end to the front crank hanger 20. This tubular member 28 is joined to the head tube 29 by the front top tube 30; the front center tube 31, and the front down tube 32, the latter being attached to the front seat mast tube 28 at the front crank hanger 20.

The two crank hangers are joined by the bottom tube 33 and the front center tube is preferably extended straight, backwardly past the front seat mast tube 28 by means of the rear center tube 34, which is attached to the rear hanger tube 21. The rear seat mast tube 35 is attached at its lower end to the rear crank hanger tube 21, and has an upwardly and rearwardly extending portion 36, which has a rearward bend at 37 and an upwardly and rearwardly extending straight portion 38.

The bend at 37 provides an offset which brings the saddle 15 back behind the rear hanger 21 in proper position relative to the pedals, while still maintaining the central portion of the tandem frame 11 in substantially the form of a parallelogram.

The rear saddle post tube 35 is joined to the front saddle post tube 28 by the rear top tube 39, and the direction of this rear top tube 39 is preferably such that the lower rear stays 40 extend in substantially a straight line in the same direction down to the rear shaft 41.

The rear seat mast tube 35 is preferably given additional support by means of a pair of upper rear stay members 42, which are attached integrally to the shaft-supporting flange 43 at the rear shaft 41, and this same flange 43, which is slotted to receive the shaft 41, is also integrally joined to the two rear fork members 44, which have their forward ends secured to the rear hanger 21.

The operation of the parts of the tandem bicycle frame in resisting the forces which are applied to it is substantially as follows: The bicycle frame is stronger against twisting action than the devices of the prior art, due to the attachment of the rear top tube 39 to the rear seat mast tube 35 at a relatively high point, as distinguished from the devices of the prior art, in which there was a much lower point of attachment.

Forces applied to the frame in the form of weight on the sides 14, 15 are resisted by upward thrust at the wheel axles 41, 45; and when the bicycle is proceeding in a straight line, there is less tendency to twist the frame than when a turn is being made.

The rear wheel axle is firmly held between its rear stays and forks, but the front wheel is held in a fork, which must be pivotally mounted in the head tube in the front part of the frame. The center of gravity is very high, as the riders sit on saddles mounted above the top of the frame; and this induces a tendency for the frame to twist sidewise because there is no firm support for the front end.

The axis of pivot for steering extends forwardly and downwardly, and places a compression on the front top tube 30 and a tension on the front down tube 32. When, however, the front wheel is turned, the outwardly projecting front fork 46 locates the point of support 47 of the front wheel at a considerable distance laterally of the frame, and the tendency is toward a twisting of the frame.

This is, of course, resisted by the front top tube 30 and front down tube 32, but the front center tube 31, which is extended in the rear center tube 34 to the rear hanger 21, is perfectly located to resist this twisting movement by a direct torsional resistance.

Such tubes have a much stronger resistance to torsion than they do to bending. Before the rear hanger 21 can be twisted out of line so as to permit the rear wheel to become out of line, both of the tubes 31, 34 would have to be subjected to a very powerful torque, which they are well adapted to resist.

Furthermore, the center tubes 31, 34 are well located to be subjected to a compression when the bicycle frame is under load, and the lower part of the bicycle frame 33, comprising the members 31, 32, 28, and 34, form a double truss which provides a maximum strength for this part of the frame.

Another truss-like arrangement is comprised by the tubular members 30, 31, 28, 29, 34 and 36, and the upper members of these trusses are subjected mainly to compression.

It will thus be observed that I have invented an improved tandem bicycle frame which, for the same amount of metal or weight of its tubular members, is stronger and adapted to resist the bending and torsional forces that are applied to such a frame when it is subjected to load.

The present cycle frame may be made much lighter in weight than the tandem bicycle frames of the prior art, while still being adapted to support relatively great weight without undue twisting or bending. Twisting or bending action is substantially eliminated so that it is scarcely noticeable.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

In a tandem bicycle, the combination of an upwardly and rearwardly extending head tube carrying a steering post and a steering wheel, the said head tube being joined solely to three rearwardly extending tubular frame members located in substantially the same axial plane, the said rearwardly extending frame members comprising a substantially horizontal front top tube, a downwardly and rearwardly extending front center tube, and a front down tube, the front down tube carrying a crank hanger tube which is joined to a seat post mast tube which extends upwardly and rearwardly and is joined to the front top tube and front center tube, the frame also including a direct axial extension of the front center tube rearwardly and downwardly to a rear crank hanger tube, which crank hanger tube is also joined by a horizontal bottom tube to the first-mentioned crank hanger tube and by a seat post mast tube to a rear top tube, which rear top tube extends rearwardly and downwardly in alignment with a rearwardly and downwardly extending rear fork, the rear crank hanger being also joined to a lower rear fork, and there being an upper fork which is joined to the rear seat post mast tube, all the rear forks having their legs which are on the same side joined together at a rear shaft support.

FRANK W. SCHWINN.